Feb. 17, 1959   J. LOVE   2,873,495
TOGGLE FASTENERS
Filed April 12, 1954   2 Sheets-Sheet 1
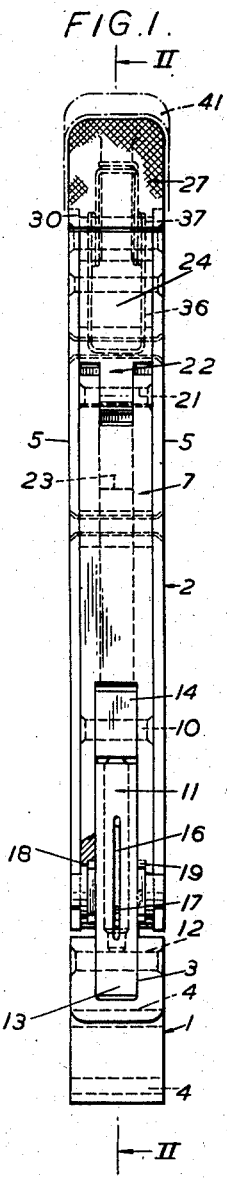
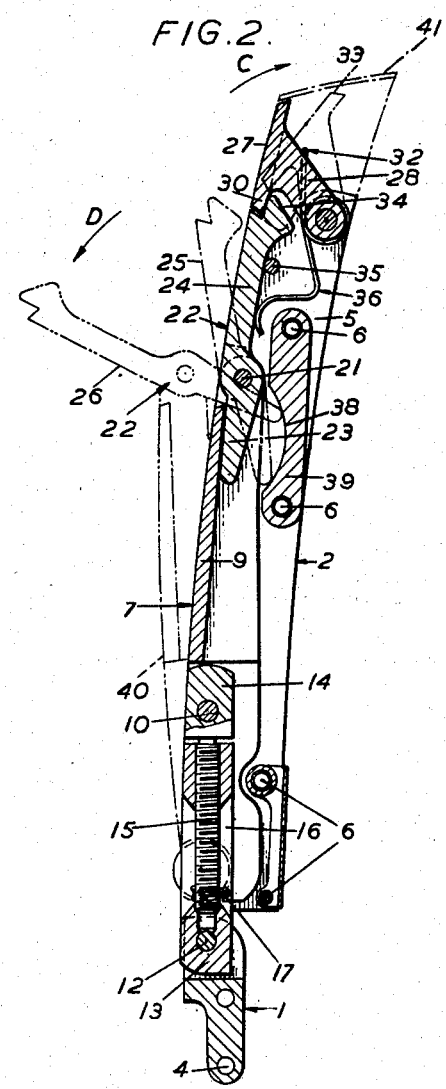
Inventor
JOHN LOVE
Attorney

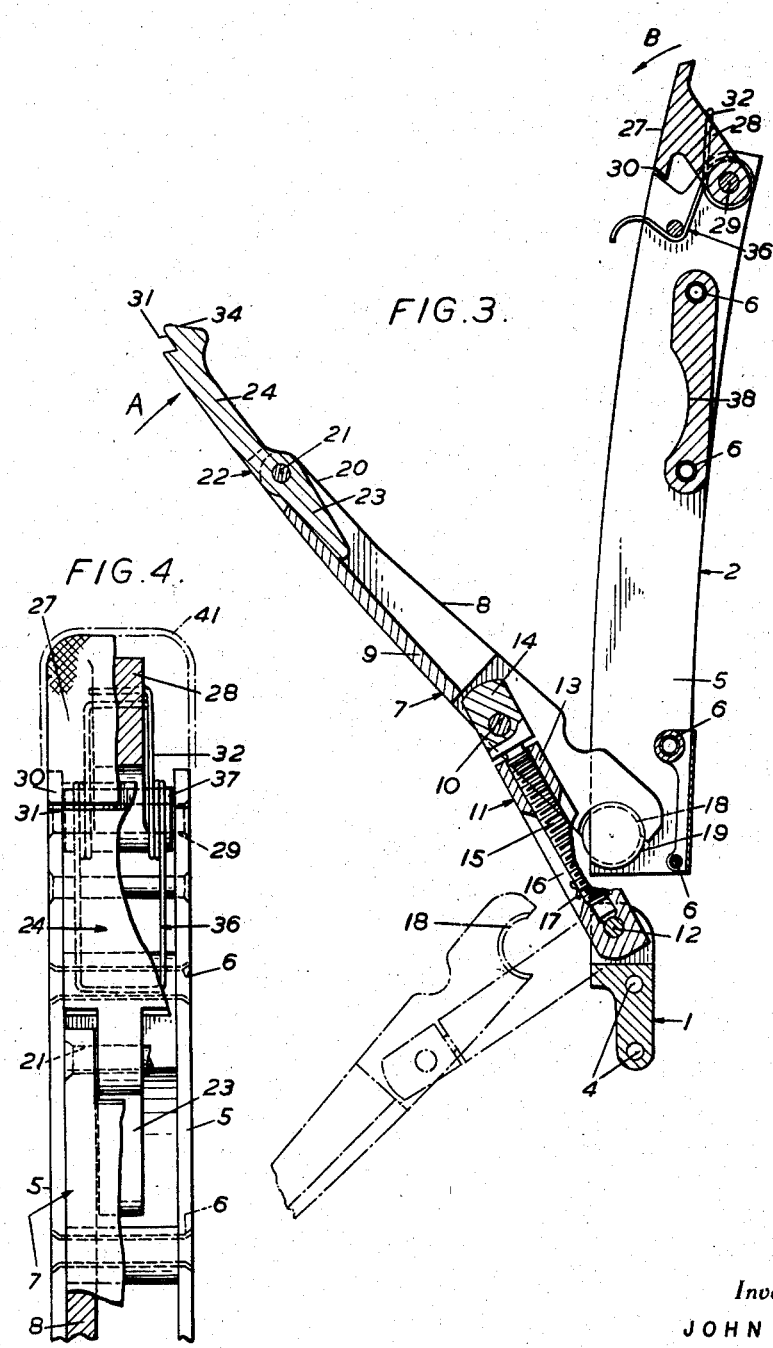

United States Patent Office 2,873,495
Patented Feb. 17, 1959

2,873,495

TOGGLE FASTENERS

John Love, Langside, Glasgow, Scotland, assignor to K. A. C. Limited, Glasgow, Scotland, a British company Application April 12, 1954, Serial No. 422,623

Claims priority, application Great Britain December 2, 1953

4 Claims. (Cl. 24—68)

This invention concerns two-part toggle fasteners for releasably securing together two members (e. g. two parts of an aircraft engine or other cowling, a removable panel and its supporting structure, fairings and the like) which are, when released, relatively movable, e. g. away from one another, the fasteners being of the kind comprising a primary part and a secondary part respectively adapted to be carried one by each of the said relatively movable members, the said primary part carrying a link on which is pivoted a locking or toggle lever (hereinafter called a "toggle lever") having fulcrum means adapted to be engaged with co-operating fulcrum members on the secondary part of the fastener preparatory to the toggle lever being swung towards the secondary part of the fastener thereby to draw, and then to secure by an over-dead-centre locking of the toggle lever, the said primary and secondary parts of the fastener together.

In some cases substantial loads have to be overcome in drawing together the two relatively movable parts which are to be secured by the toggle fastener and it is an object of this invention to provide an improved toggle fastener which will be capable of dealing with the fastening of such members.

It is also frequently difficult in cold weather, or when wearing gloves, or in the dark, to open a toggle fastener of the above indicated kind. It is therefore a further object of the invention to provide means for facilitating the operation of a toggle fastener of the said kind particularly in the circumstances just referred to.

Features and advantages of the invention will become apparent from the subsequent description of one embodiment of the invention.

In order that the invention may be more readily understood, one embodiment of the same will now be described with reference to the accompanying drawings in which:

Figure 1 is a front elevation of a toggle fastener constructed in acordance with the invention;

Figure 2 is a vertical section on line II—II, Figure 1;

Figure 3 is a view similar to Figure 2 but showing the toggle fastener partly opened; and Figure 4 is a fragmentary part sectional front view of the upper portion of the secondary part of the fastener shown in Figures 1 to 3, Figure 4 being drawn to a rather larger scale than the latter figures.

The toggle fastener illustrated in the drawings comprises two principal parts, namely, a primary part 1 and a hollow secondary part 2, these two parts respectively being intended for securement one to each of two members movable relatively to one another and which are to be fastened together by the toggle fastener.

The primary part 1 of the fastener comprises a cast metal bracket having a bifurcation 3 at its upper end and adapted to be secured in position in the lower of the parts to be connected together by the toggle fastener by means of bolts, not shown, passing through transverse holes 4 in the bracket.

The secondary part 2 of the fastener comprises a hollow housing comprising two parallel side limbs or plates 5, 5 rigidly spaced apart by, for example, tubular rivets 6 through which fixing bolts can be passed, these side plates being enclosed, if desired, in an inverted U-shaped sheath indicated at 41 in Figures 1, 2 and 4.

The fastener includes a toggle lever 7 comprising a pair of parallel side cheeks 8 rigidly connected together by a cross web 9 or equivalent means and this toggle lever is pivoted between its ends, and rather nearer to one end, than to the other end upon a transverse pivot pin 10 carried by one end of a link 11 co-extensive with the toggle lever and having its other end pivoted on a pivot pin 12 in the bifurcated end 3 of the bracket forming the primary part 1 of the toggle fastener, the pivots 10 and 12 at the opposite ends of the link 11 being parallel to one another and perpendicular to the length of the link.

The link is formed in two parts 13 and 14 adjustable relatively to one another in the direction of the length of the link, this adjustment conveniently being provided for by furnishing one of the parts e. g. the male part 14, of the link with a screw threaded stem 15 screwing axially into the other part e. g. the female part 13, of the link which is longitudinally slotted as shown at 16 between its ends to enable a cotter pin 17 to be passed diametrically through the said screw threaded stem whilst having its ends engaging in the said slots to prevent the two parts of the link accidentally rotating relatively to one another.

The two side cheeks of the shorter arm of the toggle lever are spaced apart to provide a fork or bifurcation at this end of the toggle lever and at their free extremities these side cheeks are notched at 18 so as to form fulcrum means engageable over fulcrum members comprising anchorage studs or plates 19 projecting inwardly from the sides of the hollow secondary part 2 of the fastener at the end of such part nearest to the primary part of the fastener in use.

The longer arm of the toggle lever serves as the operating arm for this lever and this arm has, at its free or outer end 20, a transverse pivot pin 21 extending between its side cheeks parallel to the pivot 10 of the toggle lever itself. An auxiliary lever 22 is pivoted, at a position between its ends but nearer to one end than to the other, on the said pivot pin 21 and, in the closed condition of the fastener, this lever 22 extends co-linearly with the toggle lever so as to form an extension thereof.

The shorter arm 23 of the auxiliary lever 22 is adapted, when the auxiliary lever is co-linear with the toggle lever, to engage behind the cross web 9 of the operating arm of the toggle lever so that any fastener closing force applied in the direction of the arrow A, Figure 3, to the longer arm 24 of the auxiliary lever will be transmitted by the shorter arm 23 of this lever to the toggle lever 7, thereby to move the latter in the closing direction and provide additional leverage for this purpose. The longer arm 24 of the said auxiliary lever is, however, capable of being swung outwardly relatively to the operating arm of the toggle lever (as indicated in dot and dash lines at 25 and 26, Figure 2), so that the combined lever formed by the operating arm of the toggle lever and the longer arm of the auxiliary lever are bendable (about the pivot pin 21 connecting them) in one direction only rather like the two adjacent arms of a foldable wooden two foot rule.

The said toggle and auxiliary levers are adapted, in the closed position of the fastener, to lie within the hollow housing constituting the secondary part 2 of the fastener, preferably flush with the outer face of this housing, and a finger piece or latch plate 27 is provided to complete the closure of the front of the said housing and also for releasably retaining the said two levers in their co-extensive stowed positions. The said latch plate is conveniently carried by a lever 28 pivoted on a transverse pivot pin 29 between the upper ends of the side plates 5 of the secondary part 2 of the fastener, the latch plate 27 thus being capable of swinging about an axis parallel to the pivot of the toggle lever.

The plate 27 is adapted for engagement at the transverse latch forming edge part 30 thereof in a transverse recess 31 furnished in the free end of the arm 24 of the said auxiliary lever 22 thereby to effect the said locking of this lever in the said housing, the latch plate lever 28 being urged in its locking direction (i. e. in the direction of arrow B, Figure 3) by spring means 32 hereinafter described. Moreover, the latch plate is so constructed as to lie, when in its locking position, substantially flush with the outer surface of the auxiliary lever and toggle lever so that a garment or the like cannot catch under the auxiliary lever and accidentally release the fastener.

The finger piece or latch plate 27 is adapted to be pushed inwardly in the direction of arrow C, Figure 2, to the dotted line position 33 by digital pressure to release the arm 24 of the auxiliary lever 22 so that on this arm being forwardly withdrawn (in the direction of arrow D, Figure 2) from the secondary part 2 of the fastener, it can be used to pull the toggle lever 7 from such part of the fastener.

On the inside of the free end portion of the arm 24 of the auxiliary lever is formed an oblique chamfer 34 which, as the auxiliary lever is swung into its closed position within the said housing, bears upon the adjacent transverse edge part 30 of the latch plate 27 and pushes the latter out of its way against the action of the said spring means 32 until the auxiliary lever has fully entered the housing, whereafter the latch plate springs back into its locking position to lock the auxiliary lever against accidental withdrawal from the housing, the part 30 of the latch plate 27 engaging in the recess 31 of the arm 24 of the latch lever. Preferably the movement of the auxiliary lever 22, and consequently the toggle lever 7, into the housing is limited by a transverse stop pin 35 extending across the secondary part 2 of the fastener between the side limbs 5.

Spring means are provided to eject automatically the toggle lever extension arm 24 of the auxiliary lever 22 from the secondary part of the fastener when released from the latch plate 27. The said spring means are preferably associated with the spring means 32 for moving the latch plate 27 to its locking position and may comprise a wire spring 36 bearing upon the inner side of the arm 24 of the auxiliary lever when this is closed and stressed by the closing of the auxiliary lever so that the spring causes the lever to fly outwardly from the housing on the release of the lever.

The wire spring 36 is of U-shape, see Figures 1 and 4, and has its side arms wrapped around bosses 37 on the sides of the latch lever 28 and also engaging with the latch lever itself on the opposite side of the pivot of this lever to the said auxiliary lever. This wire spring thus serves the double purpose of ejecting the auxiliary lever and of urging the latch plate into its locking position.

Alternatively, or in addition to the said spring means, the latch lever 28 may be adapted, during its releasing movement, to operate a kicker or ejector element, such as disclosed in applicant's U. S. Patent No. 2,653,842, dated September 29, 1953, and entitled "Toggle Fastener," to eject auxiliary lever 22 from the said housing when released. This kicker or ejector element may be a lever separate from the latch lever but conveniently is formed by one or more arms rigidly associated with this latch lever which would then be in the nature of a bell crank lever, the kicker or ejector arm of the latch lever being adapted, as the latch lever is moved to its releasing position, to engage the inner surface of the arm 24 of the auxiliary lever and to eject this arm forwardly from the said housing after the auxiliary lever has been released by the latch plate. It will also be understood that even with this arrangement spring means such as spring 36 are provided to urge the latch lever 28 to its locking position.

The said shorter arm 23 of the auxiliary lever is utilised also to serve an additional purpose, namely, that of initially ejecting, during the opening of the fastener, the operating arm of the toggle lever from the secondary part of the fastener beyond an over-dead-centre release position, the said shorter arm of the lever being adapted, during the initial outward swinging of the auxiliary lever relatively to the toggle lever, to bear against a cam surface 38 provided on a cross part or member 39 located within the said housing at the inner or rear side thereof and so co-operating with the said shorter arm 23 of the auxiliary lever as progressively to cause the pivot of this lever, and consequently the operating arm of the toggle lever, to be pushed outwardly from the secondary part of the fastener as the auxiliary lever is progressively swung outwardly from its co-linear position relatively to the toggle lever. The cam surface 38 is, as shown in Figure 2, conveniently in the form of an arcuate surface eccentric to the pivot pin 21 by which the auxiliary lever 22 is carried.

The operation of the fastener above described is as follows:

Assuming that the fastener is fully closed as shown in Figures 1 and 2, then to release it the latch plate 27 is urged inwardly by digital pressure and as soon as the auxiliary lever has been released by this latch plate the arm 24 of the auxiliary lever is automatically ejected by the spring 36 forwardly from the secondary part 2 of the fastener. The arm 24 of the auxiliary lever is then grasped and pulled further forwardly and this causes the short arm 23 of the auxiliary lever to engage the cam surface 38 and powerfully to urge the operating arm of the toggle lever 7 from the secondary part 2 of the fastener to beyond the over-dead-centre released position substantially as shown in dotted lines at 40, Figure 2, whereafter a relatively light pull on the auxiliary lever will complete the release of the fastener and the parts connected thereby.

To close the fastener the toggle lever 7 is moved, conveniently through the medium of the auxiliary lever 22, into engagement with the anchorage studs or plates 19 on the secondary part of the fastener and then, by exerting pressure on the auxiliary lever and through the shorter arm 23 of the latter on the operating arm of the toggle lever, the toggle lever is swung into its fully closed position in the secondary part of the fastener, added leverage being obtainable by reason of the extended length provided for the operating arm of the toggle lever by the said auxiliary lever, the actual closing of the fastener thus being rendered easier. As the auxiliary lever 22 reaches its fully closed position its oblique surface 34 displaces the patch plate 27 which subsequently returns to its locking position (after the auxiliary lever has fully entered the secondary part of the fastener) and thereby locks the auxiliary and toggle levers in the said housing.

I claim:

1. A toggle fastener comprising a primary part and a secondary part for mounting respectively on each of two relatively separable members, said secondary part comprising a recessed housing; a link pivoted at one end to said primary part; a toggle lever, pivoted between its ends to the free end of said link, including a bifurcated end part and an operating arm; an arcuate fulcrum member within and at each side of said housing recess for engagement by said bifurcated end part of the toggle lever for partial rotation of such lever therearound to bring the latter into a locking position in which its front surface lies flush with the front surface of said secondary part and closes part of the recess in said housing, and in which the pivot of said link with the toggle lever is positioned to the rear of the plane containing the pivot of said link with said primary part and the centres of curvature of said fulcrum members;

an extension lever pivoted to the operating arm of said toggle lever and rockable to a position in which it forms an extension of said operating arm to provide increased leverage for moving the toggle lever to said locking position, said extension lever lying, when the toggle lever is in said locking position, within said housing recess with its exposed surface flush with the front surface of said secondary part; a latch plate closing the remainder of said housing recess for retaining the toggle lever in said locking position, said latch plate being rockable to release the toggle lever and having means responsive to such rocking to eject part of the extension lever out of the housing recess; and ejector means on said secondary part and said extension lever for effecting forward movement of said operating arm out of said housing recess upon further rocking of said extension lever part out of said housing recess following ejection of such part by rocking of said latch plate.

2. A toggle fastener comprising a primary part and a secondary part for mounting respectively on each of two relatively separable members, said secondary part comprising a recessed housing; a link pivoted at one end to said primary part; a toggle lever, pivoted between its ends to the free end of said link, including a bifurcated end part and an operating arm; an arcuate fulcrum member within and at each side of said housing recess for engagement by said bifurcated end part of the toggle lever for partial rotation of such lever therearound to bring the latter into a locking position in which its front surface lies flush with the front surface of said secondary part and closes part of the recess in said housing, and in which the pivot of said link with the toggle lever is positioned to the rear of the plane containing the pivot of the link with said primary part and the centres of curvature of said fulcrum members; an extension lever pivoted between its ends to the operating arm of the toggle lever and near the free end of the latter, said extension lever being rockable between an opening position in which part thereof extends forwardly of said operating arm and a closing position in which the lever extends colinearly with said operating arm and forms an extension thereof for increasing the leverage of the toggle lever during movement thereof to said locking position, the front surface of said extension lever, in the closing position thereof, forming a continuation of the front surface of said toggle lever and, in the locking position of the latter, lying flush with the front surface of the secondary part with the extension lever within and closing part of the housing recess; and ejector means comprising a cam surface within said housing recess and located for engagement by one end of said extension lever when the latter is rocked to said opening position with the toggle lever in said locking position thereby to cause forward movement of said operating arm out of said housing recess.

3. The toggle fastener of claim 2 in which said link comprises a first part pivoted to said primary fastener part and a second part pivoted to said toggle lever, said first and second link parts having a screw threaded interconnection providing adjustment of the length of the link.

4. A toggle fastener comprising a primary part and a secondary part for mounting respectively on each of two relatively separable members, said secondary part comprising a recessed housing; a link pivoted at one end to said primary part; a toggle lever, pivoted between its ends to the free end of said link, including a bifurcated end part and an operating arm; an arcuate fulcrum member within and at each side of said housing recess for engagement by said bifurcated end part of the toggle lever for partial rotation of such lever therearound to bring the latter into a locking position in which its front surface lies flush with the front surface of said secondary part and closes at least part of the recess in said housing, and in which the pivot of said link with the toggle lever is positioned to the rear of the plane containing the pivot of the link with said primary part and the centres of curvature of said fulcrum members, an extension lever pivoted to the operating arm of said toggle lever providing increased leverage for moving the latter to its said locking position and rockable, when the toggle lever is in its said locking position, from a position in which its exposed surface is flush with the front surface of the secondary part to an opening position in which part thereof extends forwardly of said operating arm to be grasped for pulling the toggle lever out of its said locking position; and ejector means comprising a cam surface within the housing recess and located for engagement by one end of the extension lever when the latter is rocked towards its said opening position with the toggle lever in its locking position thereby to cause forward movement of the operating arm out of said housing recess.

References Cited in the file of this patent

UNITED STATES PATENTS

| | | |
|---|---|---|
| 257,263 | Wood | May 2, 1882 |
| 268,723 | Parker | Dec. 5, 1882 |
| 513,727 | Potts | Jan. 30, 1894 |
| 1,241,364 | Ferris | Sept. 25, 1917 |
| 1,771,249 | Domler | July 22, 1930 |
| 2,075,381 | Vaughn | Mar. 30, 1937 |

FOREIGN PATENTS

| | | |
|---|---|---|
| 234,990 | Great Britain | June 11, 1925 |
| 644,699 | Great Britain | Oct. 18, 1950 |
| 681,949 | Great Britain | Oct. 29, 1952 |